July 15, 1969
R. C. STOLL
3,455,012
APPARATUS FOR AND METHOD OF REMOVING COOLING PLATES
Filed July 13, 1966
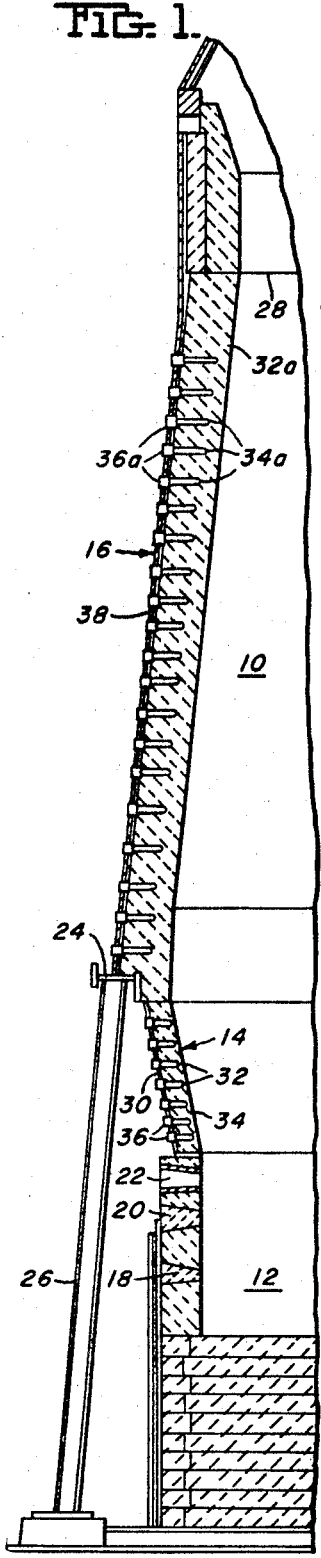
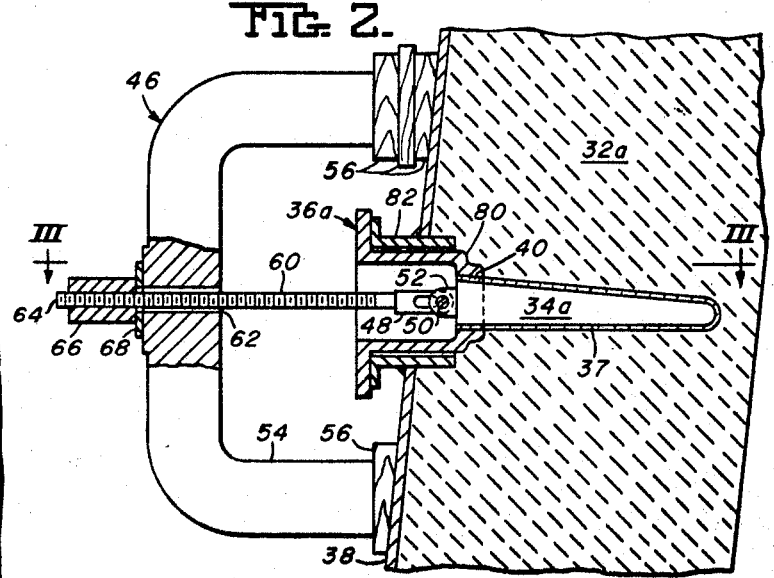
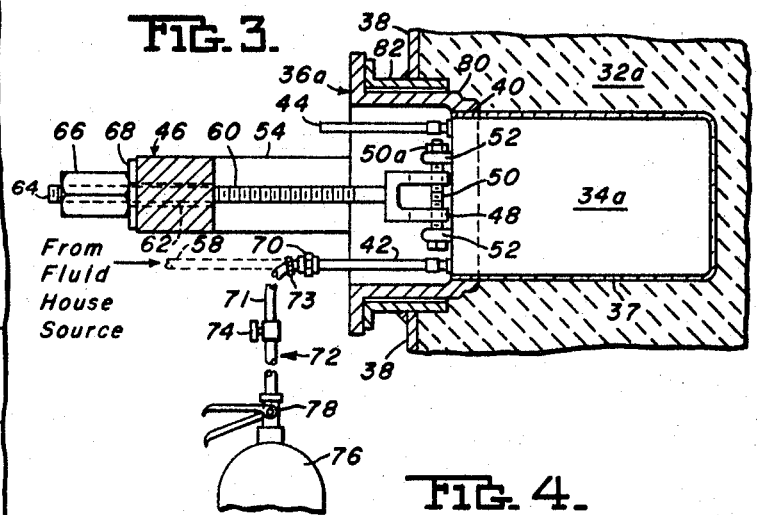
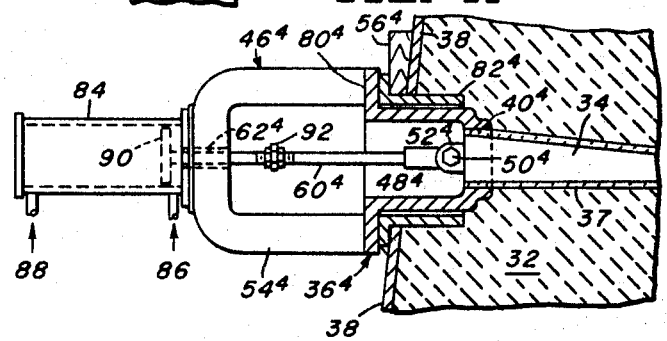
INVENTOR.
RAYMOND C. STOLL
By Donald G. Dalton
Attorney

United States Patent Office 3,455,012
Patented July 15, 1969

3,455,012
APPARATUS FOR AND METHOD OF REMOVING COOLING PLATES
Raymond C. Stoll, Bloom Township, Cook County, Ill., assignor to United States Steel Corporation, a corporation of Delaware
Filed July 13, 1966, Ser. No. 564,993
Int. Cl. F25d 25/00
U.S. Cl. 29—427
5 Claims

ABSTRACT OF THE DISCLOSURE

This invention relates to blast furnaces, and more particularly to an improved apparatus for and a method of removing cooling plates from a blast furnace.

Background of the invention

The apparatus for breaking a first bond between a hollow cooling plate and a cooling plate holder of a blast furnace having a shell and a second bond between the cooling plate and a refractory lining contained in the shell has the cooling plate being provided with fluid inlet means and fluid outlet means, a first low temperature fluid supply means adjacent the cooling plate and connected to the fluid inlet means for introducing a first low temperature fluid into the cooling plate to maintain the temperature of the cooling plate below the temperature of the refractory lining. The first low temperature fluid supply means is operable to eliminate the flow of the first low temperature fluid through the cooling plate so that the temperature of the cooling plate increases and the cooling plate expands against the cooling plate holder and the refractory lining to loosen said cooling plate therefrom. A second low temperature fluid supply means distinct from the first low temperature fluid supply means is adjacent the cooling plate and connected to one of the fluid inlet means and the fluid outlet means for introducing a second low temperature fluid into the cooling plate to reduce the temperature of the expanded cooling plate substantially below the temperature of the refractory lining so that the cooling plate rapidly contracts and shrinks away from the cooling plate holder and the refractory lining. Puller means are connected to the cooling plate and bearing against one of the cooling plate holder and the shell for withdrawing the cooling plate from the cooling plate holder and the refractory lining.

The method of breaking a first bond between a hollow cooling plate and a cooling plate holder of a blast furnace having a shell and a second bond between the cooling plate and a refractory lining contained in the shell comprising the steps of introducing a first low temperature fluid into the cooling plate to maintain the temperature of the cooling plate below the temperature of the refractory lining, eliminating the flow of the first low temperature fluid into the cooling plate so that the temperature of the cooling plate rises and the cooling plate expands against the cooling plate holder and the refractory lining to loosen the cooling plate therefrom, introducing a second low temperature fluid distinct from the first low temperature fluid into the cooling plate to reduce the temperature of the expanded cooling plate substantially below the temperature of the refractory lining so that the cooling plate rapidly contracts and shrinks away from the cooling plate holder and the refractory lining, and pulling the cooling plate from the cooling plate holder and the refractory lining by bearing against one of the cooling plate holder and the shell.

In conventional blast furnace construction, the shell of a blast furnace has an upper portion or stack in the form of a truncated cone where the burden is preheated and prereduced. The stack is supported on the mantle which in turn rests on the columns and a lower inverted frusto conical portion or bosh where melting begins. This shell is constructed of adjacent plates which are matched and butt welded together. The shell is lined with a refractory, such as ceramic bricks. The bosh starts at the top of the vertical sidewall of the hearth and extends upwardly to the level of maximum furnace diameter at the mantle and comprises bosh rings separated by a refractory lining. In order to cool the stack and the bosh, hollow generally wedge shaped, water cooled copper cooling plates are inserted in spaced openings in the stack and bosh and are secured thereto by cooling plate holders.

Conventional cooling plates for the stack and bosh are similar to the type disclosed in United States Patent No. 2,722,412, issued Nov. 1, 1955, to O. B. Anderson et al. Each cooling plate is provided with an internal baffle plate to direct the flow pattern of cooling water from a cooling water inlet to a cooling water outlet. Each cooling plate has a flat bottom and an arched top and is tapered along its length to form a wedge shape. The spaced horizontal rows of about 600 cooling plates extend from the bottom of the bosh to within about eight feet of the stock line in the upper portion of the stack.

During a blast furnace campaign the continuous abrasive charging of stock (iron ore, coke, limestone, etc.) into the blast furnace, chemical reactions within the blast furnace and the continuous high operating temperatures within the blast furnace erode the refractory lining with attendant damage to the cooling plates. In particular, a cooling plate sometimes expands against the cooling plate holder and into the refractory lining thereby requiring replacement. Further, iron scab forming on the exposed nose of the cooling plate or deformation or bending of the nose hinders removal of the damaged cooling plate. In addition, downward pressure of the refractory lining on the defective cooling plate impedes the removal of the defective cooling plate. The adhesive bond, the sealing mud or ceramic, such as ganister or brick grog, between the refractory lining and the cooling plate and the sealing bond, fire clay packing between the cooling plate holder and the cooling plate, must be broken to permit removal of the defective cooling plate.

The conventional method of removing a damaged cooling plate requires extensive burning equipment, such as an oxygen hose, oxygen lance, lance pipes and the like. The oxygen lance is used to burn the damaged cooling plate away from the cooling plate holder and the refractory lining and often results in damage to the cooling plate holder, shell and refractory lining. This conventional method requires about four hours for the removal of a single cooling plate.

I am aware of the following United States patents relating to the general art of the present invention: U.S. Patent No. 1,980,156, W. H. Emrick, Nov. 6, 1934; U.S. Patent No. 2,038,592, H. P. Morris, Apr. 28, 1936; U.S. Patent No. 2,399,679, G. W. Jackson, May 7, 1946 and U.S. Patent No. 2,742,176, J.K. Heyl et al., Apr. 17, 1956.

Object of the invention

It is the general object of the present invention to avoid and overcome the foregoing and other difficulties of and objections to prior art practices by the provision of an improved apparatus for and method of removing a cooling plate from the cooling plate holder and refractory lining of a blast furnace, which apparatus and method:

(a) reduces replacement time by a factor of one half;
(b) eliminates the use of expensive and cumbersome burning equipment and the attendant skilled and expensive labor utilized therewith;
(c) substantially eliminates resultant damage to the shell, cooling plate holder and refractory lining during removal of the cooling plate;

(d) utilizes simple and inexpensive apparatus for the removal of the damaged cooling plate; and (e) readily breaks the adhesive bond (the adhesive ceramic between the refractory lining and the cooling plate) and the sealing bond, fire clay packing between the cooling plate holder and the cooling plate.

Brief summary of the invention

The aforesaid objects of the present invention, and other objects which will become apparent as the description proceeds, are achieved by providing an improved apparatus for breaking a first bond between a hollow cooling plate and a cooling plate holder of a blast furnace having a shell and a second bond between the cooling plate and a refractory lining contained in the shell has the cooling plate being provided with fluid inlet means and fluid outlet means, a first low temperature fluid supply means adjacent the cooling plate and connected to the fluid inlet means for introducing a first low temperature fluid into the cooling plate to maintain the temperature of the cooling plate below the temperature of the refractory lining. The first low temperature fluid supply means is operable to eliminate the flow of the first low temperature fluid through the cooling plate so that the temperature of the cooling plate increases and the cooling plate expands against the cooling plate holder and the refractory lining to loosen said cooling plate therefrom. A second low temperature fluid supply means distinct from the first low temperature fluid supply means is adjacent the cooling plate and connected to one of the fluid inlet means and the fluid outlet means for introducing a second low temperature fluid into the cooling plate to reduce the temperature of the expanded cooling plate substantially below the temperature of the refractory lining so that the cooling plate rapidly contracts and shrinks away from the cooling plate holder and the refractory lining. Puller means are connected to the cooling plate and bearing against one of the cooling plate holder and the shell for withdrawing the cooling plate from the cooling plate holder and the refractory lining.

The method of breaking a first bond between a hollow cooling plate and a cooling plate holder of a blast furnace having a shell and a second bond between the cooling plate and a refractory lining contained in the shell comprising the steps of introducing a first low temperature fluid into the cooling plate to maintain the temperature of the cooling plate below the temperature of the refractory lining, eliminating the flow of the first low temperature fluid into the cooling plate so that the temperature of the cooling plate rises and the cooling plate expands against the cooling plate holder and the refractory lining to loosen the cooling plate therefrom, introducing a second low temperature fluid distinct from the first low temperature fluid into the cooling plate to reduce the temperature of the expanded cooling plate substantially below the temperature of the refractory lining so that the cooling plate rapidly contracts and shrinks away from the cooling plate holder and the refractory lining, and pulling cooling plate from the cooling plate holder and the refractory lining by bearing against one of the cooling plate holder and the shell.

Although the principles of the present invention are broadly applicable to metal producing furnaces in general, the present invention is particularly adapted for use in conjunction with a blast furnace and hence it has been so illustrated and will be so described.

Brief description of the several views of the drawing

For a better understanding of the present invention reference should be had to the accompanying drawing, wherein like numerals of reference indicate similar parts throughout the several views and wherein:

FIGURE 1 is a vertical sectional view of a left hand portion of a blast furnace on which the improved apparatus and method of the present invention may be employed;

FIGURE 2 is an enlarged fragmentary side elevational view partly in section of a portion of the stack and showing a puller means positioned against the stack shell and its cooperating low temperature fluid supply means connected to a cooling plate;

FIGURE 3 is a vertical sectional view taken along the line III—III of FIGURE 2 in the direction of the arrow; and FIGURE 4 is a view similar to FIGURE 2 of an alternative embodiment showing the puller means positioned against the cooling plate holder.

Detailed description

With specific reference to the form of the present invention illustrated in the drawings, and referring particularly to FIGURE 1, a blast furnace is indicated generally by the reference numeral 10.

Since the blast furnace 10 per se forms no part of the present invention, it is sufficient to say that the blast furnace 10 has a hearth 12, bosh 14 and stack 16. The hearth 12 is provided with an iron notch 18, slag notch (not shown) and tuyeres 22. The bosh 14 extends upwardly from the side walls of the hearth 12 and supports (together with the mantle 24 supported by columns 26) the stack 16, which stacks 16 extends upwardly to the stock line 28.

As shown in FIGURE 1 the bosh 14 has a plurality of bosh rings 30 separated by a refractory lining 32, such as high fired super duty refractory brick of the type similar to Varnon brick manufactured by Harbison-Walker Company, Fulton, Mo. Cooling plates 34 are secured by a sealing bond, such as fire clay packing 40, cooling plate holders 36 and by grouting 37 (FIGURE 2) to the refractory lining 32 between bosh rings 30. The fire clay packing 40 may be may be similar to Ottawa clay manufactured by Illinois Valley Mineral Company, Ottawa, Ill. The grouting 37 may by clacined plastic clay similar to Satanite clay manufactured by A. P. Green Company, Mexico, Mo. The stack 16 (FIGURES 1, 2 and 3) is also provided with similar cooling plates 34a secured in a shell 38 of the stack 16 by cooling plate holders 36a and in the refractory lining 32a by means of grouting 37. A sealing bond, such as fire clay packing 40 (FIGURE 2) secures the cooling plates 34a to the cooling plate holders 36a.

When it is necessary to remove a defective cooling plate, such as a cooling plate 34a, from the stack 16, the cooling water inlet and outlet lines (not shown) are disconnected from the cooling plate inlet 42 and cooling plate outlet 44 (FIGURE 3). Cooling water from the outlet 44 has a temperature of about 90° F. Removal of the cooling water from the cooling plate 34a permits the temperature of the cooling plate 34a to rise to a temperature in the range of about 400° F. to 500° F., the temperature of the adjacent grouting 37 and refractory lining 32a.

A plate puller assembly 46 (FIGURES 2, 3) is positioned adjacent the defective cooling plate 34a, so that a puller screw yoke 48 can be connected by a fastener, such as a bolt 50 and nut 50a, to a lug means, such as the hooks 52, on the cooling plate 34a. Thereafter the puller yoke 54 is shimmed or wedged against the shell 38 by shims, such as wood blocks 56.

For the purpose of removing any removable insulating or deleterious material or residual cooling fluid from the interior of the cooling plate 34a, to insure a clear fluid passage through the cooling plate 34a and to prevent the subsequent possible insulating effect of or freezing of such residual cooling fluid, connecting means, such as a flexible line 58 (FIGURE 3), is connected to the cooling plate inlet 42 by a coupling means, such as a coupling 70, and to a fluid house source, such as dry compressed air at about 90 p.s.i. and at ambient temperature.

As shown in FIGURES 2, 3 the plate puller assembly 46 has a puller screw 60 which carries the above-menand passes through a clearance aperture, such as the hole tioned puller screw yoke 48 on the right hand end thereof 62 in the puller yoke 54 and carries on its threaded left hand end portion 64 (as viewed in FIGURES 2, 3) a torque member, such as the nut 66, which nut 66 bears against oiled washers 68 and and then in turn against the puller yoke 54.

In order to compress the plate puller assembly 46 against the shell 38 a torque applying means, such as a lever (not shown) or a fluid operated impact wrench (not shown), but similar to Model 577 manufactured by Ingersoll-Rand Company, New York, N.Y., is connected to the nut 66 and runs out until such impact wrench (not shown) stalls or clutches out.

Thereafter the flexible line 58 is disconnected from the coupling 70 (FIGURE 3) and a flexible line 71 of a low temperature fluid supply means 72 is connected to the coupling 70. Such low temperature fluid supply means 72 also has a metering means, such as for example, a manual regulating valve 74 and a low temperature fluid source, such as a carbon dioxide fire extinguisher 76, similar to a Model 20 Carbon Dioxide hand fire extinguisher manufactured by Walter Kidde Company, Bloomfield, N.J. and filled with about 57 pounds of carbon dioxide at a pressure of about 900 p.s.i. Aerating means, such as the screen 73, aerates the carbon dioxide. The fire extinguisher 76 is provided with a manual dead man switch type outlet valve 78. Operation of valves 72, 78 introduces low temperature cooling fluid, such as carbon dioxide into the cooling plate 34a via inlet 42 so that such cooling plate 34 contacts (upon being cooled from a temperature in the range of 400° F. to 500° F. to a temperature in the range of 30° F. to 90° F. by the carbon dioxide) and shrinks away from the cooling plate holder 36a and the refractory lining 32a. The prior removal of removable insulating material, etc. from the cooling plate 34a insures that the cooling plate 34a will receive maximum cooling effect from the carbon dioxide passing therethrough.

Further operation of the impact wrench (not shown) on the nut 66, pulls the cooled cooling plate 34a from the cooling plate holder 36a and the refractory lining 32a.

Alternative embodiments

It will be understood by those skilled in the art that alternatively, as shown in FIGURE 4, the puller yoke 54⁴ may be tensioned or wedged against a body 80⁴ of the cooling plate holder 36⁴ instead of the shell 38. The plate puller assembly 46⁴ has, in addition, the stop 82⁴ secured, as by welding, to the shell 38. In addition, a fluid cylinder 84 having fluid inlets 86, 88 to control the reciprocating movement of the piston 90 affixed to the puller rod 60⁴ is employed. A coupling 92 connects the piston 90 to the puller rod 60⁴.

Summary of the achievement of the objects of the invention

It will be recognized by those skilled in the art that the objects of the present invention have been achieved by providing an improved apparatus for and method of breaking the bond between a hollow cooling plate 34, 34a and a cooling plate holder 36, 36a and the refractory lining 32, 32a of a blast furnace 10. This improved method and apparatus reduces replacement time by a factor of one half; eliminates the use of expensive and cumbersome burning equipment and the attendant skilled and expensive labor utilized therewith; substantially eliminates resultant damage to the shell 38, cooling plate holder 36, 36a and refractory lining 32, 32a during removal of the cooling plate 34, 34a; utilizes simple and inexpensive apparatus for the removal of the damaged cooling plate 34, 34a; and readily breaks the adhesive bond 37, the adhesive ceramic between the refractory lining 32, 32a and the cooling plate 34, 34a and the sealing bond between, such as fire clay packing 40 between the cooling plate holder 36, 36a and the cooling plate 34, 34a.

While in accordance with the patent statutes, preferred and alternative embodiments of the present invention have been illustrated and described in detail, it is to be particularly understood that the invention is not limited thereto or thereby.

I claim:

1. Apparatus for breaking a first bond between a hollow cooling plate and a cooling plate holder of a blast furnace having a shell and a second bond between said cooling plate and a refractory lining contained in said shell, said apparatus comprising:
   (a) said cooling plate being provided with fluid inlet means and fluid outlet means,
   (a) a first low temperature fluid supply means adjacent said cooling plate and connected to said fluid inlet means for introducing a first low temperature fluid into said cooling plate to maintain the temperature of said cooling plate below the temperature of said refractory lining,
      (1) said first low temperature fluid supply means being operable to eliminate the flow of said first low temperature fluid through said cooling plate so that said temperature of said cooling plate increases and said cooling plate expands against said cooling plate holder and said refractory lining to loosen said cooling plate therefrom,
   (c) a second low temperature fluid supply means distinct from said first low temperature fluid supply means adjacent said cooling plate and connected to one of said fluid inlet means and said fluid outlet means for introducing a second low temperature fluid into said cooling plate to reduce said temperature of said expanded cooling plate substantially below said temperature of said refractory lining so that said cooling plate rapidly contracts and shrinks away from said cooling plate holder and said refractory lining, and
   (d) puller means connected to said cooling plate and bearing against one of said cooling plate holder and said shell for withdrawing said cooling plate from said cooling plate holder and said refractory lining.

2. A method of breaking a first bond between a hollow cooling plate and a cooling plate holder of a blast furnace having a shell and a second bond between said cooling plate and a refractory lining contained in said shell, said method comprising the steps of:
   (a) introducing a first low temperature fluid into said cooling plate to maintain the temperature of said cooling plate below the temperature of said refractory lining,
   (b) eliminating the flow of said first low temperature fluid into said cooling plate so that said temperature of said cooling plate rises and said cooling plate expands against said cooling plate holder and said refractory lining to loosen said cooling plate therefrom,
   (c) introducing a second low temperature fluid distinct from said first low temperature fluid into said cooling plate to reduce said temperature of said expanded cooling plate substantially below said temperature of said refractory lining so that said cooling plate rapidly contracts and shrinks away from said cooling plate holder and said refractory lining, and
   (d) pulling said cooling plate from said cooling plate holder and said refractory lining by bearing against one of said cooling plate holder and said shell.

3. The apparatus recited in claim 1 wherein said cooling plate is provided with lug means.

4. The apparatus recited in claim 1 and having pneumatic means connectable to said fluid inlet means for removing any removable insulating and deleterious material and residual cooling fluid from the interior of said cooling plate prior to introduction of said low temperature fluid into said cooling plate to insure a clear fluid passage through said cooling plate and to prevent the subsequent freezing of said residual cooling fluid in said cooling plate.

5. The method recited in claim 2 and including the step of:
  (a) first introducing a cleansing fluid into said cooling plate to remove removable insulating and deleterious material and residual first low temperature fluid from the interior of said cooling plate to insure a clear fluid passage through said cooling plate and to prevent the subsequent freezing of said residual first low temperature fluid in said cooling plate.

References Cited

UNITED STATES PATENTS

| | | | |
|---|---|---|---|
| 1,647,041 | 10/1927 | Gerwig | 266—32 X |
| 1,980,156 | 11/1934 | Enrick | 29—252 |
| 2,038,592 | 4/1936 | Morris | 62—86 X |
| 2,399,679 | 5/1946 | Jackson | 29—426 X |
| 2,722,412 | 11/1955 | Anderson et al. | 266—32 |
| 2,742,176 | 4/1956 | Heyl et al. | 62—62 |
| 3,185,465 | 5/1965 | Patton | 266—32 |
| 3,325,159 | 6/1967 | Loecher | 266—32 |

OTHER REFERENCES

"Modern Refrigeration and Air Conditioning" by Althouse et al., Chapter 11, pages 257–262.

JOHN F. CAMPBELL, Primary Examiner

R. B. LAZANIS, Assistant Examiner

U.S. Cl. X.R.

29—426; 62—62; 156—584; 266—32

UNITED STATES PATENT OFFICE
CERTIFICATE OF CORRECTION

Patent No. 3,455,012                                              July 15, 1969

Raymond C. Stoll

It is certified that error appears in the above identified patent and that said Letters Patent are hereby corrected as shown below:

Column 1, line 18, cancel "Background of the invention" and insert the same after line 69, same column 1. Column 4, line 28, "stacks" should read -- stack --; line 37, cancel "may be"; line 39, "clacined" should read -- calcined --. Column 5, line 1, cancel "and passes through a clearance aperture, such as the hole" and insert the same after line 2, same column 5; line 6, cancel "and", second occurrence. Column 6, line 14, "(a)" should read -- (b) --.

Signed and sealed this 5th day of May 1970.

(SEAL)

Attest:

Edward M. Fletcher, Jr.

Attesting Officer

WILLIAM E. SCHUYLER, JR.

Commissioner of Patents